(No Model.)
C. E. BUZBY.
ELECTRIC APPARATUS FOR AUTOMATIC WEIGHING.
No. 521,331. Patented June 12, 1894.
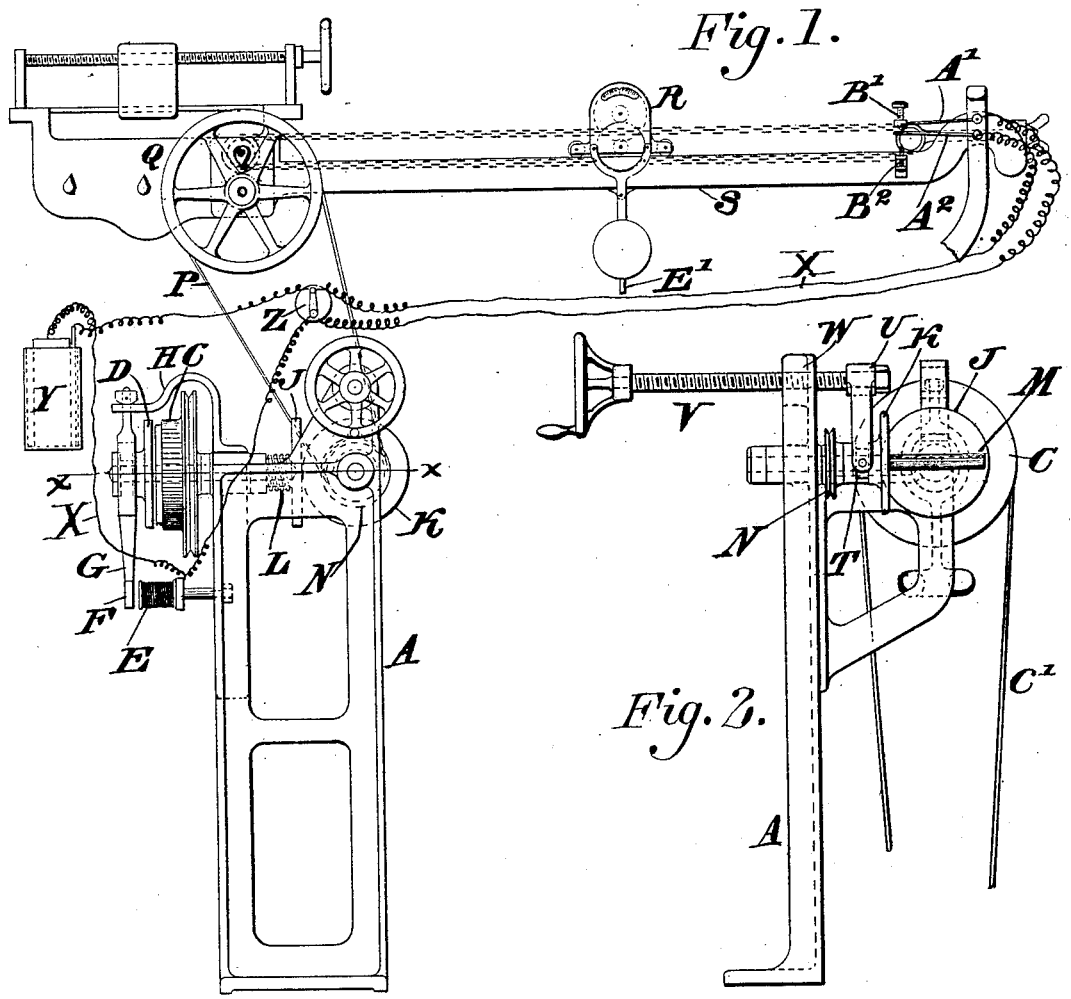
WITNESSES:
A. P. Jennings.
R. H. Graeser.
INVENTOR
Charles Ernest Buzby.
BY John A. Wiedersheim
ATTORNEY.
THE NATIONAL LITHOGRAPHING COMPANY,
WASHINGTON, D. C.

UNITED STATES PATENT OFFICE.

CHARLES E. BUZBY, OF PHILADELPHIA, PENNSYLVANIA, ASSIGNOR TO FREDERICK A. RIEHLE, OF SAME PLACE.

ELECTRIC APPARATUS FOR AUTOMATIC WEIGHING.

SPECIFICATION forming part of Letters Patent No. 521,331, dated June 12, 1894.

Application filed July 12, 1893. Serial No. 480,207. (No model.)

*To all whom it may concern:*

Be it known that I, CHARLES ERNEST BUZBY, a citizen of the United States, residing in the city and county of Philadelphia, State of Pennsylvania, have invented a new and useful Improvement in Testing-Machines, which improvement is fully set forth in the following specification and accompanying drawings.

My invention consists of a testing machine having means for automatically weighing.

It also consists of means for varying the rated speed of the traveling poise, both gradually and to a great extent, and of means for reversing the motion of said poise.

Figure 1 represents a side elevation of the portion of a testing machine embodying my invention. Fig. 2 represents an end view of a portion thereof. Fig. 3 represents a horizontal section on line $x$, $x$, Fig. 1.

Similar letters of reference indicate corresponding parts in the several figures.

Referring to the drawings: A designates a frame on which is mounted the shaft B.

C designates a pulley which is loose on the shaft B, and D designates a plate which is connected with the shaft B by means of a feather D', so as to rotate with the same and to move to and from the pulley C, said plate and pulley thus forming a clutch.

E designates a magnet which is connected with the frame A, and F designates an armature which is carried by the lever G, the latter freely depending from the arm H on the frame A, and is connected with the hub of the clutch member or plate D.

Mounted on the end of the shaft B opposite to the plate D is a friction wheel J, with whose side face contacts the friction wheel K, said wheels being evidently at a right angle to each other. The wheel J is connected with the shaft B by a feather and is pressed against the wheel K by means of the suitably-applied spring L. The wheel K is mounted on the shaft M by means of a feather, so as to rotate with the same and slide thereon, it being capable of being moved across the face of the wheel J, so as to change the velocity of the wheel K, and reverse the motion of the same, the same being communicated to the shaft M and consequently to the pulley N, which latter is secured to said shaft, and is adapted to communicate motion by means of the belt P to the poise hand wheel Q, which by means of sprocket wheels and an endless cord or chain is adapted to move the poise R on the beam S, after the manner of that shown in the Letters Patent of the United States, No. 368,574, granted to me on the 16th day of August, 1887.

In order to move or adjust the wheel K on the wheel J, the hub T of the former has connected with it the shifter fork U, to which is journaled the screw V, which has a rapid pitch and is fitted in a nut W on the frame A, so that by the rotation of the screw, motion may be imparted to the wheel K, relatively to the direction of said rotation, it being noticed that the pulley C is driven by means of a belt C' from the hub of one of the main driving pulleys of the testing machine, and when the latter is in operation, said pulley C is in continuous rotation.

X designates electric wires which are connected with the battery Y and magnet E, the switch Z and the contact pieces $A'$, $A^2$, which latter are supported near the outer end of the beam S. The piece $A'$ is provided with a screw $B'$, and the beam S with a screw $B^2$, said screws being opposite to each other, and having the point $A^3$ between the same, and serving to adjust or regulate the amount of vibration allowed the beam S for different purposes.

Depending from the body of the poise R is a finger E' which is adapted to strike the lever of the switch Z, and break the electric circuit, as will be hereinafter set forth.

The operation is as follows: When the machine is in action, the pulley C runs freely on the shaft B, and the latter is at rest. As soon as the pressure is applied to the specimen, the beam S is caused to rise until a circuit is made by the screw $B^2$ coming in contact with and raising the end of the contact piece $A^2$ until it is in contact with the screw $B'$ on the contact piece $A'$, whereby the magnet E attracts the armature F, and the lever G is moved, thus closing the clutch member D against the pulley C, as the other clutch member, whereby the shaft B is rotated and the power is communicated to the friction wheels J and K, and thus to the shaft M, pulley N, the wheel Q and the poise R, the latter traveling on the beam S until said beam falls again. When the specimen breaks, the motion of the poise stops, and the reading of the poise is taken. The friction wheel K is now moved to the opposite portion of the wheel J by the operation of the screw V, and the circuit is made by the switch Z. As the motion of the wheel Q is now reversed, the poise R travels back to zero. The finger E strikes the switch lever thus breaking the circuit whereby the armature lever G is released, and the clutch is separated or opened, the shaft B then being inactive and the poise R again at rest. If desired, the switch can be clamped to any part of a bar beneath and parallel with the beam, so that its lever may be thrown out at any point. I may also employ two pulleys such as C, and a double set of magnets with circuits at the bottom of the beam, as well as at the top thereof, can be arranged so as to keep the beam in a continuous balance.

When the speed changing and reversing mechanism is not employed, the wheel Q may be run by a pulley on the shaft B. The wheel K has a tire of rubber or other suitable material for increasing the frictional contact of the wheel J therewith.

Having thus described my invention, what I claim as new, and desire to secure by Letters Patent, is—

1. In a testing machine, a weighing beam with a traveling poise, an electric circuit with magnet, and contact points, a shaft having therein a loosely-mounted pulley with a clutch member, a friction wheel splined on said shaft, a lever connected with the clutch member and carrying an armature, a second friction wheel adjustable across the face of the first mentioned friction wheel and in contact therewith, and mechanism substantially as described connecting said adjustable friction wheel with operating mechanism for said poise, said parts being combined substantially as described.

2. A testing machine having a weighing beam with a poise therein, an electric circuit with contact points and a magnet, a screw on said beam adapted to contact with one of said contact points and close said circuit, a shaft with a loose pulley thereon, a clutch member keyed on said shaft with operating lever and armature, a friction wheel rotatable with said shaft, a second rotary shaft carrying a friction wheel rotatable therewith and in contact with said first mentioned friction wheel, and a pulley on said second shaft having a belt connection with a pulley in the poise traveling mechanism, said parts being combined substantially as described.

3. A testing device having a weighing beam with a traveling poise thereon, an electric circuit with contact points and a magnet, a shaft with a loose pulley thereon, and a clutch member, a lever and armature for operating said clutch, a friction wheel keyed on said shaft, a second shaft with a friction wheel keyed thereon and in contact with said first mentioned friction wheel, a spring bearing against said first mentioned friction wheel, a pulley on said second shaft, belt and pulleys for reciprocating said poise and operating mechanism between and connecting said poise reciprocating mechanism and said last mentioned shaft pulley, said parts being combined substantially as described.

4. A testing machine having a weighing beam with a poise thereon, an electric circuit with contact points for closing the said circuit, and a magnet, a switch operated by a projection on the poise for breaking the circuit, a loose pulley driven by the motor of the machine, mechanism consisting of bands, wheels and pulleys for moving the said poise, and a clutch with operative mechanism for connecting said loose pulley and said poise operating mechanism, said parts being combined substantially as described.

5. In a testing machine, a beam and a traveling poise thereon, mechanism including a clutch for operating said poise, a lever for the movable member of said clutch, an armature on said lever, and a magnet for said armature, an electric circuit and a switch therein, in combination with means on said poise adapted to engage said switch for breaking the circuit, substantially as described.

CHARLES E. BUZBY.

Witnesses:
JOHN A. WIEDERSHEIM,
A. P. JENNINGS.